United States Patent
Chen et al.

(10) Patent No.: US 12,360,910 B1
(45) Date of Patent: Jul. 15, 2025

(54) METHOD, DEVICE, AND COMPUTER PROGRAM PRODUCT FOR CACHING

(71) Applicant: Dell Products L.P., Round Rock, TX (US)

(72) Inventors: Qiang Chen, Shanghai (CN); Pedro Fernandez Orellana, Shanghai (CN)

(73) Assignee: Dell Products L.P., Round Rock, TX (US)

(*) Notice: Subject to any disclaimer, the term of this patent is extended or adjusted under 35 U.S.C. 154(b) by 67 days.

(21) Appl. No.: 18/435,557

(22) Filed: Feb. 7, 2024

(30) Foreign Application Priority Data

Jan. 12, 2024 (CN) .......................... 202410054866.4

(51) Int. Cl.
*G06F 12/0886* (2016.01)

(52) U.S. Cl.
CPC ................ *G06F 12/0886* (2013.01)

(58) Field of Classification Search
None
See application file for complete search history.

(56) References Cited

U.S. PATENT DOCUMENTS

| | | | | |
|---|---|---|---|---|
| 11,747,998 B1* | 9/2023 | Indupuru | ............... | G06F 3/061 711/164 |
| 2024/0195877 A1* | 6/2024 | Xue | ...................... | H04L 67/142 |
| 2024/0419493 A1* | 12/2024 | Ramanujan | ........... | G06F 9/5027 |

OTHER PUBLICATIONS

Yunho Jin et al.: "SA3: Increasing GPU Utilization during Generative Inference for Higher Throughput", arxiv.org, Cornell University Library, 201 OLIN Library Cornell University Ithaca, NY 14853, Jun. 9, 2023 (Jun. 9, 2023), xXP091534052, p. 1-p. 9. (Year: 2023).*

D. Timonin et al., "Accelerated Inference for Large Transformer Models Using NVIDIA Triton Inference Server," https://developer.nvidia.com/blog/accelerated-inference-for-large-transformer-models-using-nvidia-fastertransformer-and-nvidia-triton-inference-server/, Aug. 3, 2022, 8 pages.

H. Barad et al., "Leveraging Speculative Sampling and KV-Cache Optimizations Together for Generative AI using OpenVINO," arXiv:2311.04951v1, Nov. 8, 2023, 5 pages.

* cited by examiner

*Primary Examiner* — Yaima Rigol
(74) *Attorney, Agent, or Firm* — Ryan, Mason & Lewis, LLP

(57) ABSTRACT

Embodiments of the present disclosure relate to a method, a device, and a computer program product for caching. The method includes determining whether a length of a to-be-processed token sequence is greater than a cache length threshold associated with a key-value (KV) data cache. The method further includes determining, in response to the length of the to-be-processed token sequence being greater than the cache length threshold, target KV data based on a token sequence exceeding the cache length threshold in the to-be-processed token sequence. In addition, the method further includes determining a target token based on the to-be-processed token sequence, the KV data cache, and the target KV data.

20 Claims, 6 Drawing Sheets

METHOD, DEVICE, AND COMPUTER PROGRAM PRODUCT FOR CACHING

RELATED APPLICATION

The present application claims priority to Chinese Patent Application No. 202410054866.4, filed Jan. 12, 2024, and entitled "Method, Device, and Computer Program Product for Caching," which is incorporated by reference herein in its entirety.

FIELD

Embodiments of the present disclosure generally relate to the field of computers, and more particularly, to a method, a device, and a computer program product for caching.

BACKGROUND

With continuous progress of artificial intelligence technology, applications of generative pre-training models are important in various fields. Through pre-training of a large-scale corpus, a deep language understanding and generation capability is obtained, which provides a strong support for tasks such as natural language processing, intelligent dialogue, and text generation, and promotes the development of artificial intelligence. The continuous optimization and popularization of generative pre-training models have brought more efficient and intelligent solutions to various industries.

When using the generative pre-training models for inference, caching intermediate data is one of the key methods to increase an inference speed. By storing an intermediate result computed previously, duplicate computing is avoided, thereby significantly reducing time costs of an inference process. By designing and managing the cache reasonably, computing burdens of the models in the inference process can be relieved to the greatest extent, and the overall efficiency can be improved, which provides feasible and reliable supports for practical applications of efficiency utilization of generative pre-training models.

SUMMARY

Embodiments of the present disclosure provide a method, a device, and a computer program product for caching.

In one aspect of the present disclosure, a method for caching is provided. The method includes determining whether a length of a to-be-processed token sequence is greater than a cache length threshold associated with a key-value (KV) data cache, wherein the KV data cache is related to a processed token sequence. The method further includes determining, in response to the length of the to-be-processed token sequence being greater than the cache length threshold, target KV data based on a token sequence exceeding the cache length threshold in the to-be-processed token sequence. In addition, the method further includes determining a target token based on the to-be-processed token sequence, the KV data cache, and the target KV data, wherein the target token is a next token of the to-be-processed token sequence.

In another aspect of the present disclosure, an electronic device is provided. The electronic device includes at least one processing unit and a memory, wherein the memory is coupled to the at least one processing unit and stores instructions. The instructions, when executed by the at least one processing unit, cause the electronic device to perform actions including: determining whether a length of a to-be-processed token sequence is greater than a cache length threshold associated with a KV data cache, wherein the KV data cache is related to a processed token sequence; determining, in response to the length of the to-be-processed token sequence being greater than the cache length threshold, target KV data based on a token sequence exceeding the cache length threshold in the to-be-processed token sequence; and determining a target token based on the to-be-processed token sequence, the KV data cache, and the target KV data, wherein the target token is a next token of the to-be-processed token sequence.

In yet another aspect of the present disclosure, a computer program product is provided. The computer program product is tangibly stored on a non-transitory computer-readable medium and includes machine-executable instructions. The machine-executable instructions, when executed by a machine, cause the machine to execute a method or process according to embodiments of the present disclosure.

This Summary is provided to introduce the selection of concepts in a simplified form, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of exemplary embodiments of the present disclosure, provided in more detail herein with reference to the accompanying drawings, the above and other objectives, features, and advantages of the present disclosure will become more apparent. In the exemplary embodiments of the present disclosure, the same reference numerals generally represent the same elements, and.

DETAILED DESCRIPTION

Figure 1:
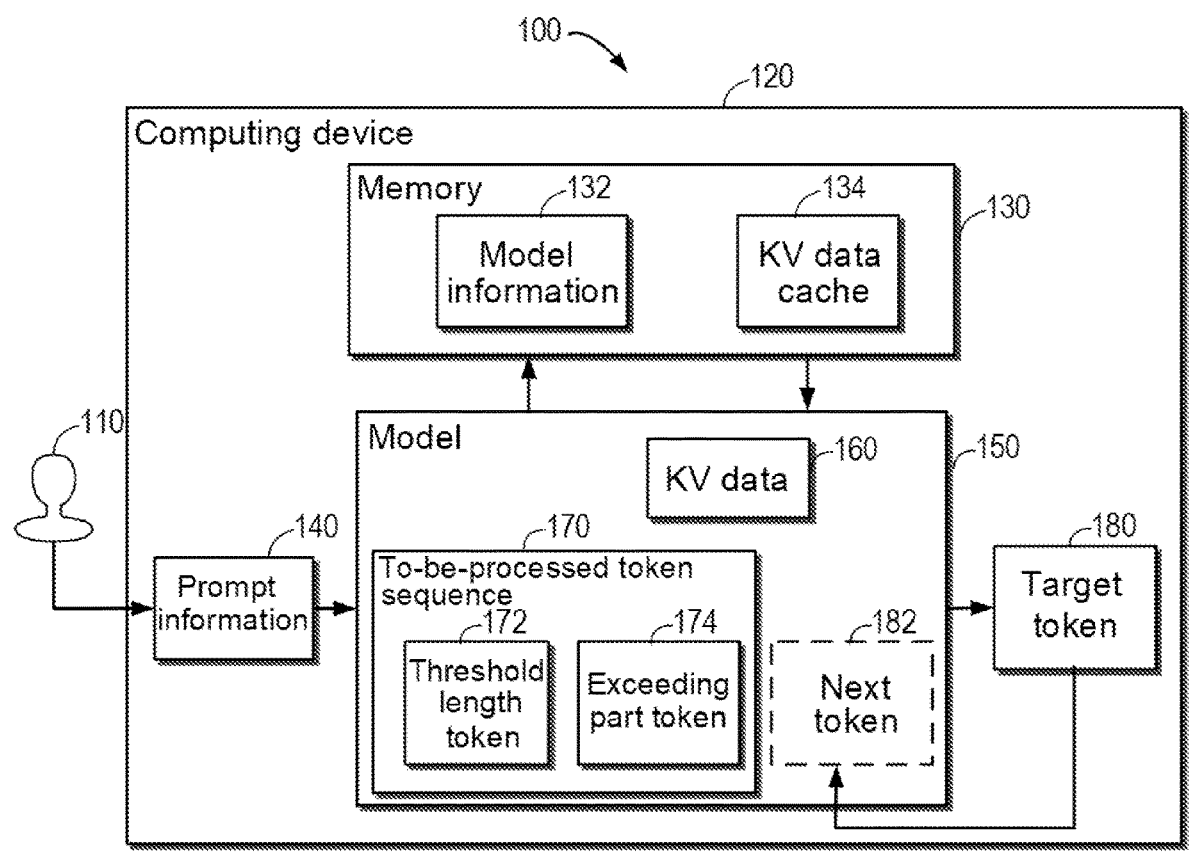
FIG. 1 shows a schematic diagram of an example environment of a system according to an embodiment of the present disclosure.

Illustrative embodiments of the present disclosure will be described in more detail below with reference to accompanying drawings. Although some specific embodiments of the present disclosure are shown in the accompanying drawings, it should be understood that the present disclosure may be implemented in various forms, and should not be construed as being limited to the embodiments set forth herein. Rather, these embodiments are provided to make the present disclosure more thorough and complete and to fully convey the scope of the present disclosure to persons of skill in the art.

The term "include" and variants thereof used herein indicate open-ended inclusion, that is, "including but not limited to." Unless specifically stated, the term "or" means "and/or." The term "based on" means "at least partially based on." The terms "an example embodiment" and "an embodiment" mean "at least one example embodiment." The term "another embodiment" means "at least one another embodiment." The terms "first," "second," and the like may refer to different or identical objects, unless otherwise specifically indicated.

As mentioned previously, with continuous progress of an artificial intelligence technology, applications of generative pre-training models are important in various fields. When using the generative pre-training models for inference, caching intermediate data generated during the inference process is one of the key methods to increase the inference speed. Caching intermediate data often requires occupying a memory space of a computing device. Therefore, when the memory space, especially a cache space, is limited, it is often impossible to enable a function of caching the intermediate data, leading to a decrease in a model inference speed. For example, related technologies for caching the intermediate data in a model inference stage often need to allocate a cache space for the intermediate data. Therefore, when an available space is limited, the function of caching the intermediate data may often be disabled.

Therefore, embodiments of the present disclosure provide a technical solution for caching. When using a model for inference, even when the cache space is small, the technology for caching the intermediate data can still be used to accelerate model inference. Specifically, in embodiments of the present disclosure, whether a length of a to-be-processed token sequence is greater than a cache length threshold is determined; if the length is greater than the cache length threshold, when processing subsequent tokens, KV data of the subsequent tokens is computed, and then a target token is determined according to the to-be-processed token sequence, a KV data cache, and the KV data of the subsequent tokens, so as to complete a model inference process.

Therefore, in embodiments of the present disclosure, when the cache space is small, the technology for caching the intermediate data can still be enabled to accelerate model inference. Correspondingly, during model inference, whether to enable the function of caching the intermediate data should not be considered according to a size of the cache space. Embodiments of the present disclosure can adaptively perform partial caching according to the cache space, so as to increase a model inference speed.

Basic principles and multiple example implementations of the present disclosure are illustrated below with reference to FIG. 1 to FIG. 6. It should be understood that these exemplary embodiments are given only to enable persons of skill in the art to better understand and then implement embodiments of the present disclosure, and are not intended to limit the scope of the present disclosure in any way.

FIG. 1 shows a schematic diagram of an example environment 100 of a system according to an embodiment of the present disclosure. As shown in FIG. 1, a user 110 may input prompt information 140 to a computing device 120. The prompt information 140 is input text or instruction provided by the user 110 to guide a model 150 to generate a corresponding output. The design of the prompt information 140 plays a crucial role in quality and content aspects of a generation result of the model 150. Reasonable construction of the prompt information not only can affect accuracy of the output of the model 150, but also can effectively guide a style and logical structure of the output. The prompt information 140 may involve, but is not limited to, text generation, question answering, content analysis, and other aspects. For example, the prompt information 140 related to the text generation may be "generating a passage about environmental protection, and introducing the importance and impact of sustainable development," the prompt information 140 related to the question answering may be "explaining applications of artificial intelligence in medical diagnosis, and discussing its potential advantages and challenges," the prompt information 140 related to the content analysis may be "analyzing possible development trends of artificial intelligence in industrial automation in the next 5 years, and exploring its potential impact on the labor market," and the types of the prompt information 140 are not limited in embodiment of the present disclosure.

The example environment 100 further includes a computing device 120, the computing device may be deployed with a model 150, and examples of the computing device 120 include, but are not limited to, a computer, a laptop, a tablet computer, a smartphone, a server, cloud services, and the like. In addition, the computing device further includes a memory 130, and the memory 130 may store model weight data, parameter data, input data (such as the prompt information 140), a KV cache, and the like of the model 150. The example environment 100 shows model information 132, which may store information data of the model 150. For example, the model information 132 may include model structural information, model weight information, and the like of the model 150. The example environment 100 further shows a KV data cache 134, which may cache intermediate KV data that may be generated in an inference stage (namely a process of using the model 150 to process the prompt information 140 and generate a final processing result) of the model 150. Such intermediate KV data may be cached in the KV data cache 134, and the KV data cache will be introduced below in detail.

The example environment 100 further includes the model 150, the model 150 may be a generative pre-training model, the generative pre-training model can learn a deep-level structure and mode of a language by performing pre-training on large-scale text data, so as to achieve a text generation capability. For example, a converter based generative pre-training model can be pre-trained on a large-scale unlabeled text data set, and text similar to a human natural language can be generated. In addition, the model 150 may also be other types of models, such as any model that needs to cache intermediate data during model inference and use, and the types of the model 150 are not limited in the present disclosure.

During model inference of the model 150, a to-be-processed token sequence 170 may be generated, and the to-be-processed token sequence 170 may change with model inference. For example, after inputting the prompt information 140, the to-be-processed token is the prompt information 140 itself. In some embodiments, the content of the prompt information may be "Please translate Hello, World! into English," and then the to-be-processed token sequence 170 is "Please translate Hello, World! into English." Token refers to the smallest semantic unit, and it should be understood that a punctuation also belongs to the token. In addition, after word segmentation processing, the to-be-processed token sequence 170 is "Please translate Hello, World! into English," and a length of the to-be-processed token sequence 170 may be determined to be 9. The model 150 may generate a target token 180 by processing the to-be-processed token sequence 170. For example, the generated target token 180 may be "Hello," then the model 150 may take the target token 180 as a next token 182 and add it behind the to-be-processed token sequence 170, the updated to-be-processed token sequence 170 may be "Please translate Hello, World! into English Hello," and the length of the updated to-be-processed token sequence 170 is 10.

In the process of the model 150 generating the target token 180, since the model 150 may involve an attention mechanism, it is necessary to generate a key matrix and a value matrix for the to-be-processed token sequence 170, and lengths of the key matrix and the value matrix are the same as the length of the to-be-processed token sequence 170. As mentioned earlier, since the updated to-be-processed token sequence 170 is only adding the target token 180 behind the previous to-be-processed token sequence 170, the key matrix and the value matrix of the to-be-processed token sequence 170 can be cached, in an example of what is more generally referred to herein as a KV data cache, wherein each token illustratively corresponds to one piece of KV data, which may be a row vector of the key matrix and a row vector of the value matrix. Therefore, when generating the target token 180, KV data is generated only for the next token 182. In the KV data, a given value is identified by its corresponding key.

As mentioned earlier, during the first round of processing, the to-be-processed token sequence 170 is "Please translate Hello, World! into English," and then the KV data related to it may be cached in the KV data cache 134. When the to-be-processed token sequence 170 is updated to be "Please translate Hello, World! into English Hello," only KV data of the token "Hello" needs to be computed, and then the KV data cache is merged with the current KV data to obtain the updated to-be-processed token sequence by combining the current to-be-processed token sequence, such as "Please translate Hello, World! into English Hello," that is, the target token 180 is ",". It is easy to understand that a final token sequence may be "Please translate Hello, World! into English Hello, World!"

For the sake of convenience, the cache length threshold may be set as 10, that is, the KV data cache 134 may cache KV data of 10 tokens. When the length of the to-be-processed token sequence 170 exceeds the cache length threshold, the to-be-processed token sequence 170 may be divided into two parts, namely a threshold length token 172 and an exceeding part token 174. Then when the to-be-processed token sequence 170 is "Please translate Hello, World! into English Hello, World", the threshold length token 172 is "Please translate Hello, World! into English Hello", and the exceeding part token 174 is ", World". As mentioned earlier, the KV data of the threshold length token 172 has been cached into the KV data cache 134. Therefore, it is only necessary to compute the KV data 160 for the exceeding part token 174, rather than computing the KV data for the entire to-be-processed token sequence 170. It should be understood that when the length of the to-be-processed token sequence 170 does not exceed the cache length threshold, it is not necessary to divide the to-be-processed token sequence 170 into two parts.

Figure 2:
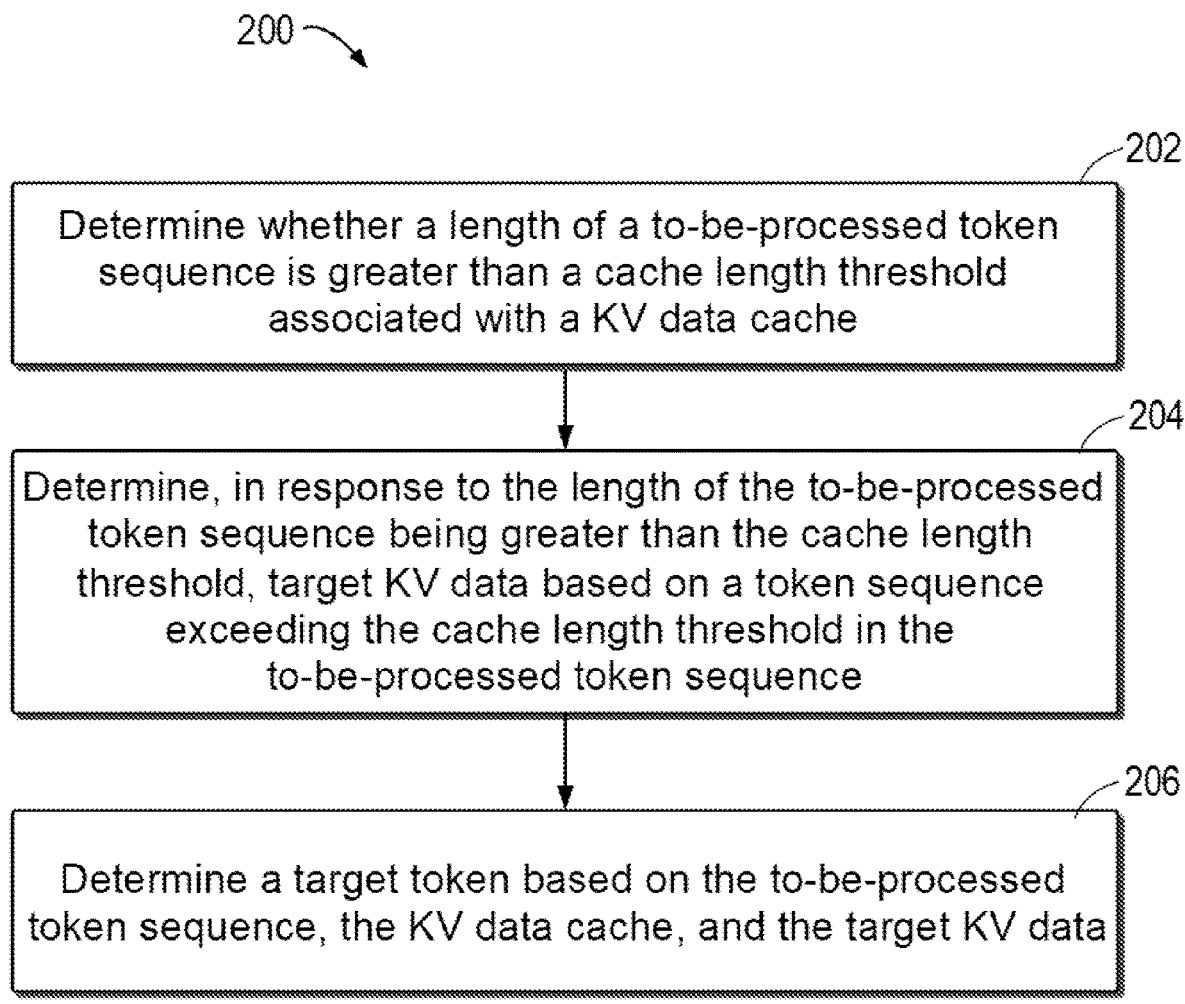
FIG. 2 shows a flow chart of a method for caching according to the present disclosure.

FIG. 2 shows a flow chart of a method 200 for caching according to the present disclosure. Referring to FIG. 2, in block 202, whether a length of a to-be-processed token sequence is greater than a cache length threshold associated with a KV data cache may be determined. For example, referring to FIG. 1, whether the length of the to-be-processed token sequence 170 is greater than the cache length threshold of the KV data cache 134 may be determined.

In block 204, in response to the length of the to-be-processed token sequence being greater than the cache length threshold, target KV data may be determined based on a token sequence exceeding the cache length threshold in the to-be-processed token sequence. For example, as described in FIG. 1, target KV data 160 may be determined based on the exceeding part token 174 exceeding the cache length threshold in the to-be-processed token sequence 170.

In block 206, a target token may be determined based on the to-be-processed token sequence, the KV data cache, and the target KV data. For example, as described in FIG. 1, the target token 180 may be determined based on the to-be-processed token sequence 170, the KV data cache 134, and the KV data 160.

Therefore, according to the method 200 of an embodiment of the present disclosure, when the KV data may exceed a size of the KV data cache, the KV data cache is enabled for the parts that do not exceed the cache length threshold, and corresponding KV data is computed for the parts that exceed the cache length threshold. Therefore, when a cache space is insufficient, model inference can still be accelerated.

Figure 3A:
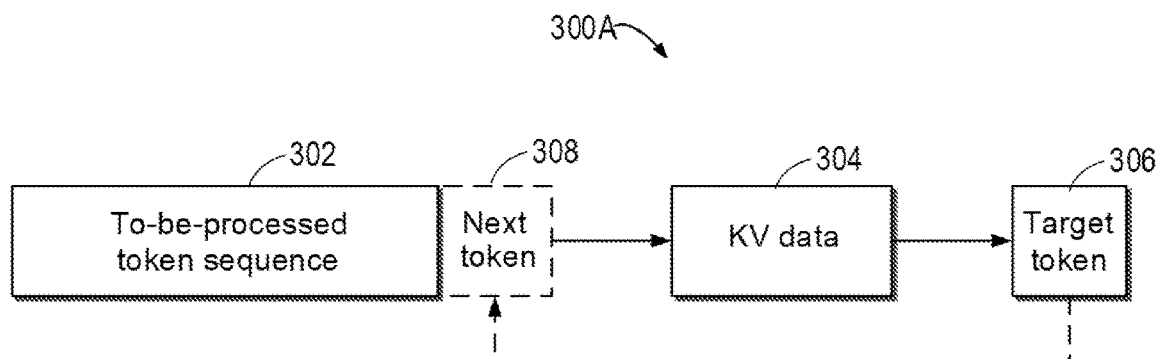
FIG. 3A shows a schematic diagram of a model inference process when a KV data cache is not enabled.

FIG. 3A shows a schematic diagram of a model inference process 300A when a KV data cache is not enabled. As shown in FIG. 3A, a model (such as the model 150 in FIG. 1) firstly may generate KV data 304 according to a to-be-processed token sequence 302, and generate a target token 306 according to the to-be-processed token sequence 302 and the KV data 304. As mentioned earlier, the model may take the target token 306 as a next token 308 and add it behind the to-be-processed token sequence 302 to generate an updated to-be-processed token sequence 302. It is easy to understand that the model may continue to process the updated to-be-processed token sequence 302 until processing ends. For example, when the target token 306 is a generation ending flag, it may indicate that model inference is completed. It may be seen that when the KV data cache is not enabled, it is necessary to generate the KV data 304 for the to-be-processed token sequence 302 each time. Since the to-be-processed token sequence 302 only adds one new token at a tail of the sequence each time, not enabling the KV data cache may result in duplicate data computing, thereby decelerating the model inference process and affecting usage of the user.

Figure 3B:
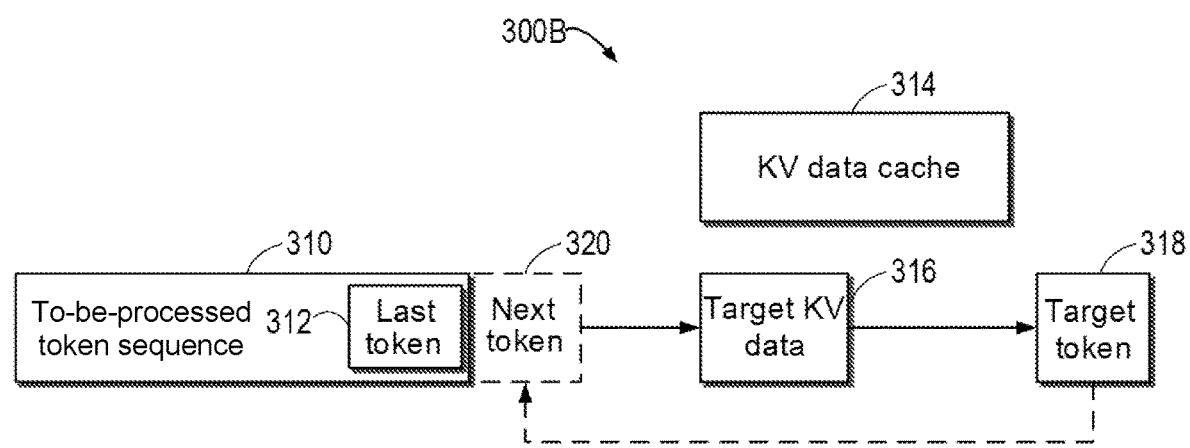
FIG. 3B shows a schematic diagram of a model inference process when a KV data cache is enabled according to an embodiment of the present disclosure.

FIG. 3B shows a block diagram of a model inference process 300B when a KV data cache is enabled according to an embodiment of the present disclosure. As shown in FIG. 3B, when a length of a to-be-processed token sequence 310 is smaller than or equal to a cache length threshold, target KV data 316 may be generated only for a last token 312. Since the KV data cache is enabled, the KV data of the previous to-be-processed token has been cached into the KV data cache 314. Therefore, the KV data of other tokens in the to-be-processed token sequence 310 except for the last token 312 may be acquired from the KV data cache 314, and the target KV data 316 is generated only for the last token 312, thereby generating a target token 318. After generating the target token 318, the target token 318 may be taken as a next token 320 and added behind the to-be-processed token sequence 310, which is taken as the updated to-be-processed token sequence 310. In addition, an updated KV data cache 314 may be generated after adding the target KV data 316 into the KV data cache 314. It may be understood that the target KV data 316 is the KV data of the last token 312.

Comparing the process 300A with the process 300B, it may be seen that by enabling the KV data cache, the KV data may be repeatedly computed, and a model inference speed may be increased. However, in an inference process of a generative model, since lengths of prompt information (such as the prompt information 140 in FIG. 1) and finally generated output text may reach thousands or even tens of thousands of tokens, it will occupy a large quantity of KV data caches, which may cause an out of memory (OOM) problem. During inference of the model, since a computing device cannot allocate sufficient memory for the model, interruption or breakdown of a program is caused.

Figure 4:
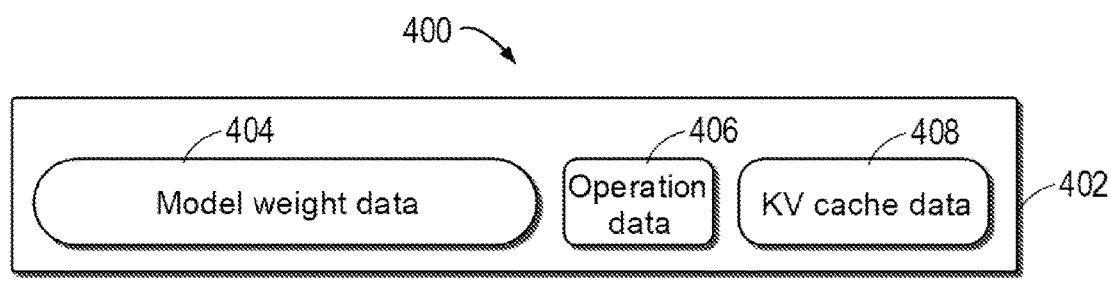
FIG. 4 shows a schematic diagram of a memory use state on a graphics processing unit (GPU) according to an embodiment of the present disclosure.

FIG. 4 shows a schematic diagram of a memory use state 400 on a graphics processing unit (GPU) 402 according to an embodiment of the present disclosure. Due to a large quantity of parameters of a generative pre-training model, training and inference of the generative model are often performed on the GPU.

The GPU 402 may store model weight data 404, operation data 406, and KV cache data 408. When model inference is performed on the GPU 402, it may often be faced with a problem of memory constraint, especially when processing inference of a large-scale generative pre-training model. Due to the large quantity of parameters of the generative pre-training model, it almost occupies most of a memory space of the GPU 402. In addition, the GPU 402 not only needs to store the parameters of the model, but also needs to provide a sufficient memory space for the operation data 406. Therefore, due to limitations of the memory of the GPU 402, only a limited space can be allocated for the KV cache data.

For example, when an available space of the KV cache data 408 can only accommodate a token sequence with a length of 500, a relevant KV cache technology may need to disable the KV cache function, resulting in the process shown in FIG. 3A. This is because when the token sequence exceeds 500, an OOM problem may be caused, resulting in interruption to or breakdown of the program. A process of using a KV data cache according to an embodiment of the present disclosure will be described below with reference to FIG. 3C.

Figure 3C:
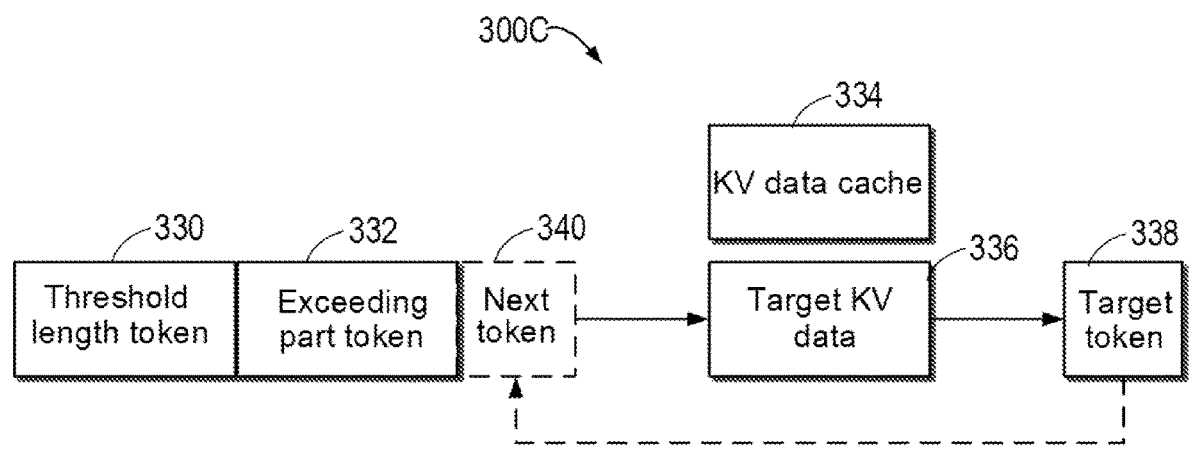
FIG. 3C shows a model inference process when a length of a token sequence exceeds a threshold according to an embodiment of the present disclosure.

FIG. 3C shows a model inference process 300C when a length of a token sequence according to an embodiment of the present disclosure exceeds a threshold. As shown in FIG. 3C, since a length of a to-be-processed token sequence has exceeded a cache length threshold, the to-be-processed token sequence is divided into a threshold length token 330 and an exceeding part token 332. For example, when the cache length threshold is 500, a length of the threshold length token 330 is also 500, and KV data of the threshold length token 330 is a KV data cache 334. It may be understood that a length of the KV data cache 334 is also 500 at this time. Therefore, it is only necessary to compute target KV data 336 for the exceeding part token 332. For example, when the length of the exceeding part token 332 is 50, it is only necessary to compute the KV data for these 50 tokens. If when the KV cache function is disabled due to a small KV cache space, it is necessary to compute KV cache for 550 tokens, which will lead to a decrease in a model inference speed.

Figure 5:
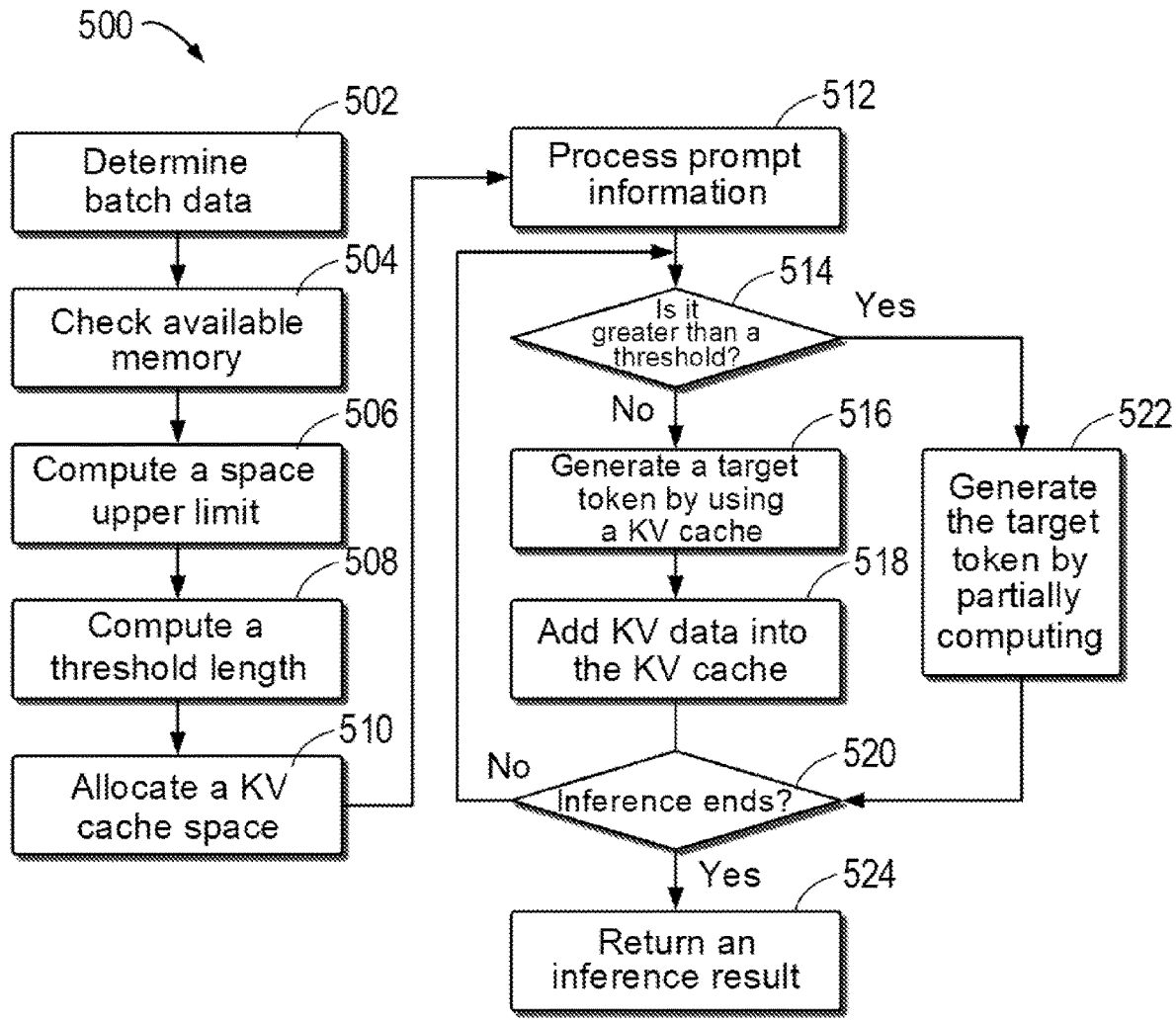
FIG. 5 shows a flow chart of a process for model inference according to an embodiment of the present disclosure.

FIG. 5 shows a flow chart of a process 500 for model inference according to an embodiment of the present disclosure. As shown in FIG. 5, in block 502, batch data may be determined. For example, during model inference, data is often inputted in batches, and therefore, it is necessary to determine a size of the batch, for example, the size of the batch may be 512. In block 504, an available memory space may be checked. For example, a size of a current available space may be acquired through an application programming interface (API) related to a GPU, for example, the available space may be 2 GB. In block 506, an available space upper limit of a KV cache may be computed. As shown in FIG. 4, since it is necessary to reserve spaces for model weight data, operation data and the like, it is necessary to compute the available space upper limit of the KV cache based on the available space, the model weight data, the operation data and the like. In addition, in some embodiments, a plurality of different models may be run on the GPU, and the available space upper limit of the KV cache may still be computed.

In block 508, a cache threshold length may be computed. For example, since the length of the KV cache relative to the token sequence is linear, an actual upper limit will be rounded to a nearest integer multiple, so as to compute the cache threshold length. For example, a storage space occupied by the KV data of each token is fixed, so that the size of the batch may be combined to determine how many tokens for which the KV data may be cached, and thus the cache threshold length may be determined. In block 510, a KV cache space may be allocated. For example, an actual KV cache space may be allocated according to the cache threshold length, the storage space occupied by the KV data of each token, and the size of the batch.

In block 512, prompt information may be processed. For example, in conjunction with FIG. 1, since the prompt information 140 is directly inputted, KV data of the prompt information 140 may be determined and cached into the KV data cache 134. In block 514, whether a length of a to-be-processed token sequence is greater than a cache length threshold may be judged, and if not greater than the cache length threshold, it proceeds to block 516. In block 516, a target token is generated by using a KV cache. For example, in conjunction with FIG. 3B, the target KV data 316 may be generated only for the last token 312, and then the target token 318 is generated by using the KV data cache 314 and the target KV data 316. In block 518, KV data may be added into the KV cache. For example, in conjunction with FIG. 3B, the target KV data 316 may be added into the KV data cache 314. Then, it proceeds to block 520, and whether model inference ends may be judged. In some embodiments, if the outputted target token is an ending flag (such as "EOS"), it may be determined that model inference ends. If the outputted target token is not an ending flag, it may return to block 514. In addition, the target token may be added into the to-be-processed token sequence to generate an updated to-be-processed token sequence.

In block 514, if the length of the to-be-processed token sequence is greater than the cache length threshold, it proceeds to block 522. In block 522, a target token may be generated by partially computing. For example, in conjunction with FIG. 3C, target KV data 336 may be generated for the exceeding part token 332, and then the target token 338 may be generated according to the KV data cache 334 and the target KV data 336. The resulting target token 338 becomes next token 340 as illustrated. It should be understood that since the KV data cache 334 has reached the threshold, the target KV data may not be added into the KV data cache 334, so that OOM problems and program interruption are avoided. In block 520, if the outputted target token is an ending flag, it may be determined that model inference ends, and it proceeds to block 524 to return an inference result.

Figure 6:
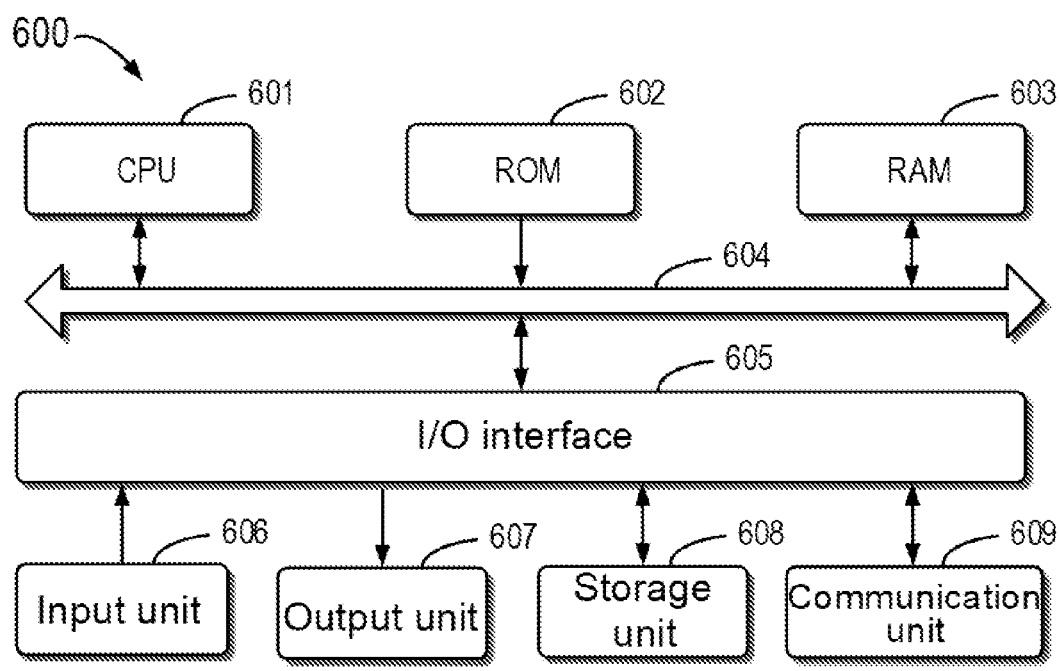
FIG. 6 shows a block diagram of a device that may be used to implement embodiments of the present disclosure.

FIG. 6 shows a block diagram of a device 600 that may be used to implement embodiments of the present disclosure. The device 600 may be a device or an apparatus as described in embodiments of the present disclosure. As shown in FIG. 6, the device 600 includes a central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to one another through a bus 604. An input/output (I/O) interface 605 is also connected to the bus 604.

A plurality of components in the device 600 are connected to the I/O interface 605 and include: an input unit 606, such as a keyboard and a mouse; an output unit 607, such as various types of displays and speakers; the storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various methods or processes described above may be performed by the CPU 601. For example, in some embodiments, the methods may be implemented as a computer software program that is tangibly included in a machine-readable medium, such as the storage unit 608. In some embodiments, part or all of the computer program may be loaded and/or installed onto the device 600 via the ROM 602 and/or the communication unit 609. When the computer program is loaded onto the RAM 603 and executed by the CPU 601, one or more steps or actions of the methods or processes described above may be executed.

In some embodiments, the methods and processes described above may be implemented as a computer program product. The computer program product may include a computer-readable storage medium on which computer-readable program instructions for executing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions may also be loaded onto a computer, other programmable data processing apparatuses, or other devices, so that a series of operating steps are executed on the computer, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for caching, comprising:
   determining whether a length of a to-be-processed token sequence is greater than a cache length threshold associated with a key-value (KV) data cache, wherein the KV data cache is related to a processed token sequence;
   determining, in response to the length of the to-be-processed token sequence being greater than the cache length threshold, target KV data based on a token sequence exceeding the cache length threshold in the to-be-processed token sequence; and
   determining a target token based on the to-be-processed token sequence, the KV data cache, and the target KV data, wherein the target token is a next token of the to-be-processed token sequence.

2. The method according to claim 1, further comprising:
   determining, in response to the length of the to-be-processed token sequence being smaller than or equal to the cache length threshold, the target KV data based on a last token in the to-be-processed token sequence; and
   determining the target token based on the to-be-processed token sequence, the KV data cache, and the target KV data.

3. The method according to claim 2, further comprising:
   adding, in response to the length of the KV data cache being smaller than the cache length threshold, the target KV data into the KV data cache.

4. The method according to claim 3, further comprising:
   generating an updated to-be-processed token sequence by adding the target token into the to-be-processed token sequence.

5. The method according to claim 1, wherein the KV data cache is cached on a graphics processing unit, and the cache length threshold is determined based on a memory of the graphics processing unit.

6. The method according to claim 5, wherein the cache length threshold is determined by:
   determining an available memory space of the graphics processing unit; and
   determining the cache length threshold based on the available memory space and occupied memory of the target KV data.

7. The method according to claim 6, further comprising:
   allocating a cache space for the KV data cache based on the cache length threshold.

8. The method according to claim 1, wherein the KV data cache comprises KV data associated with a token of prompt information.

9. The method according to claim 8, further comprising:
   determining the to-be-processed token sequence and the target token based on the prompt information, wherein the prompt information is text information; and
   determining output text associated with the prompt information based on the to-be-processed token sequence and the target token.

10. The method according to claim 9, wherein determining the output text associated with the prompt information comprises:
    determining an updated to-be-processed token sequence and a next target token based on the to-be-processed token sequence and the target token; and
    determining the output text associated with the prompt information based on the updated to-be-processed token sequence and the next target token.

11. An electronic device, comprising:
    at least one processing unit; and
    a memory, coupled to the at least one processing unit and storing instructions, wherein the instructions, when executed by at least one the processing unit, cause the electronic device to perform actions comprising:
    determining whether a length of a to-be-processed token sequence is greater than a cache length threshold associated with a key-value (KV) data cache, wherein the KV data cache is related to a processed token sequence;
    determining, in response to the length of the to-be-processed token sequence being greater than the cache length threshold, target KV data based on a token sequence exceeding the cache length threshold in the to-be-processed token sequence; and
    determining a target token based on the to-be-processed token sequence, the KV data cache, and the target KV data, wherein the target token is a next token of the to-be-processed token sequence.

12. The electronic device according to claim 11, wherein the actions further comprise:
    determining, in response to the length of the to-be-processed token sequence being smaller than or equal to the cache length threshold, the target KV data based on a last token in the to-be-processed token sequence; and
    determining the target token based on the to-be-processed token sequence, the KV data cache, and the target KV data.

13. The electronic device according to claim 12, wherein the actions further comprise:
    adding, in response to the length of the KV data cache being smaller than the cache length threshold, the target KV data into the KV data cache.

14. The electronic device according to claim 13, wherein the actions further comprise:
    generating an updated to-be-processed token sequence by adding the target token into the to-be-processed token sequence.

15. The electronic device according to claim 11, wherein the KV data cache is cached on a graphics processing unit, and the cache length threshold is determined based on a memory of the graphics processing unit.

16. The electronic device according to claim 15, wherein the cache length threshold is determined by:
   determining an available memory space of the graphics processing unit; and
   determining the cache length threshold based on the available memory space and occupied memory of the target KV data.

17. The electronic device according to claim 16, wherein the actions further comprise:
   allocating a cache space for the KV data cache based on the cache length threshold.

18. The electronic device according to claim 11, wherein the KV data cache comprises KV data associated with a token of prompt information.

19. The electronic device according to claim 18, wherein the actions further comprise:
   determining the to-be-processed token sequence and the target token based on the prompt information, wherein the prompt information is text information; and
   determining output text associated with the prompt information based on the to-be-processed token sequence and the target token.

20. A computer program product, wherein the computer program product is tangibly stored on a non-transitory computer-readable medium and comprises machine-executable instructions, and the machine-executable instructions, when executed by a machine, cause the machine to perform actions comprising:
   determining whether a length of a to-be-processed token sequence is greater than a cache length threshold associated with a key-value (KV) data cache, wherein the KV data cache is related to a processed token sequence;
   determining, in response to the length of the to-be-processed token sequence being greater than the cache length threshold, target KV data based on a token sequence exceeding the cache length threshold in the to-be-processed token sequence; and
   determining a target token based on the to-be-processed token sequence, the KV data cache, and the target KV data, wherein the target token is a next token of the to-be-processed token sequence.

\* \* \* \* \*